United States Patent
Page

(10) Patent No.: US 7,918,435 B2
(45) Date of Patent: Apr. 5, 2011

(54) COMBINATION GRAVIMETRIC AND VOLUMETRIC DISPENSER FOR MULTIPLE FLUIDS

(75) Inventor: Steven R. Page, Palatine, IL (US)

(73) Assignee: Fluid Management, Inc., Wheeling, IL (US)

( * ) Notice: Subject to any disclaimer, the term of this patent is extended or adjusted under 35 U.S.C. 154(b) by 1152 days.

(21) Appl. No.: 11/608,516

(22) Filed: Dec. 8, 2006

(65) Prior Publication Data

US 2007/0095421 A1 May 3, 2007

Related U.S. Application Data

(60) Continuation-in-part of application No. 11/297,920, filed on Dec. 8, 2005, now Pat. No. 7,147,012, which is a division of application No. 10/697,411, filed on Oct. 30, 2003, now Pat. No. 6,991,004.

(51) Int. Cl.
F16K 31/04 (2006.01)
(52) U.S. Cl. ................. 251/77; 251/129.11
(58) Field of Classification Search .......... 251/129.11, 251/129.12, 129.13, 77
See application file for complete search history.

(56) References Cited

U.S. PATENT DOCUMENTS

| | | | |
|---|---|---|---|
| 3,670,785 A | 6/1972 | Heiss et al. | |
| 4,097,786 A * | 6/1978 | Lund | 251/129.11 |
| 4,705,083 A | 11/1987 | Rossetti | |
| 4,844,297 A * | 7/1989 | Smith | 222/1 |
| 5,027,928 A * | 7/1991 | Poucher | 188/266.4 |
| 5,031,781 A | 7/1991 | Price et al. | |
| 5,083,591 A | 1/1992 | Edwards et al. | |
| 5,163,484 A | 11/1992 | Howlett et al. | |
| 5,168,200 A * | 12/1992 | Payne | 251/129.11 |
| 5,203,387 A | 4/1993 | Howlett et al. | |
| 5,268,849 A | 12/1993 | Howlett et al. | |
| 5,365,722 A | 11/1994 | Edwards et al. | |
| 5,460,297 A | 10/1995 | Shannon et al. | |
| 5,501,201 A * | 3/1996 | Miyoshi et al. | 251/129.11 |
| 5,649,451 A * | 7/1997 | Ruland | 74/89.3 |
| 5,938,030 A | 8/1999 | Haaser et al. | |
| 6,003,535 A * | 12/1999 | Ollivier | 137/8 |
| 6,064,170 A * | 5/2000 | Spurr et al. | 318/685 |
| 6,221,145 B1 | 4/2001 | McClain | |
| 6,270,054 B1 * | 8/2001 | Mazur | 251/129.11 |
| 6,285,155 B1 * | 9/2001 | Maske et al. | 318/685 |
| 6,540,486 B2 | 4/2003 | Amsler et al. | |
| 6,991,004 B2 | 1/2006 | Kaufhold et al. | |
| 2003/0019885 A1 | 1/2003 | Luehrsen et al. | |
| 2004/0135112 A1* | 7/2004 | Greeb et al. | 251/214 |
| 2006/0086405 A1 | 4/2006 | Kaufhold et al. | |

* cited by examiner

*Primary Examiner* — John Bastianelli
(74) *Attorney, Agent, or Firm* — Miller, Matthias & Hull LLP

(57) ABSTRACT

A combination gravimetric and volumetric fluid dispenser which includes a scale linked to a controller. The controller is linked to a plurality of two stage valves which control the dispensing of large quantities of base materials. The controller is also linked to a plurality of nutating pumps which together with the controller controls the dispensing of smaller quantities of additive materials. The base material dispensing valves include stepper motor actuators having multiple steps per revolution and are under the control of an analog signal from a controller. The base material dispensing valve is opened or closed via a rod that is slidably raised or lowered upon rotation of the drive shaft of the stepper motor actuator.

6 Claims, 9 Drawing Sheets

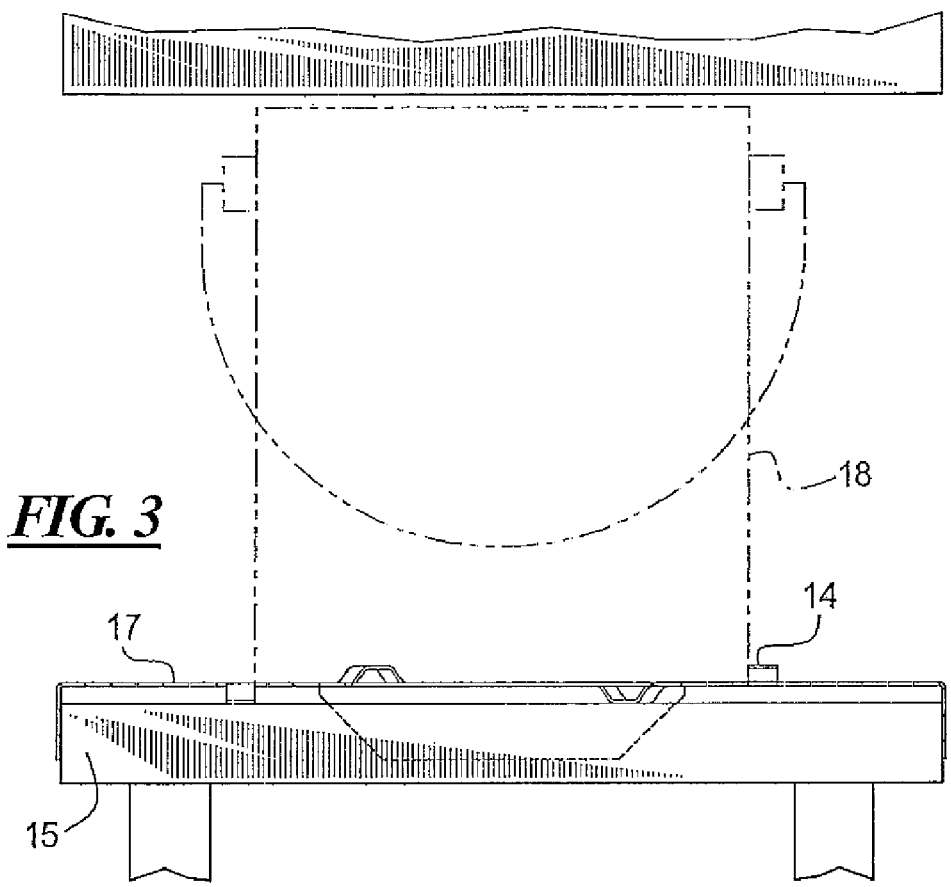
*FIG. 3*
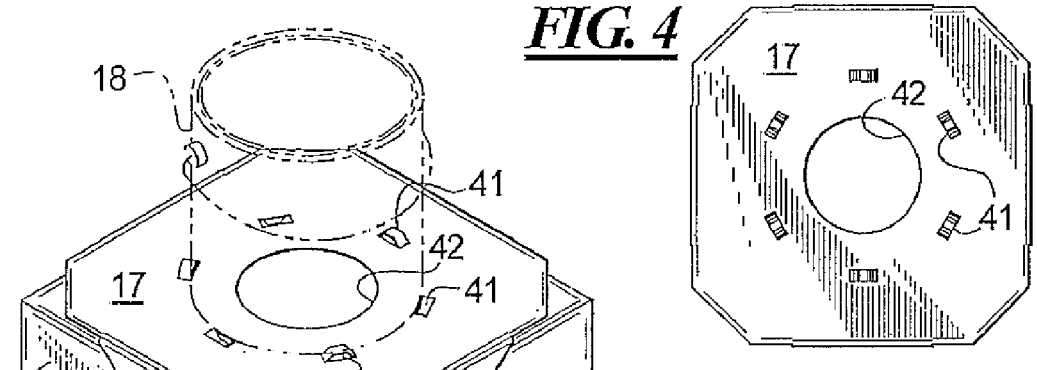
*FIG. 4*
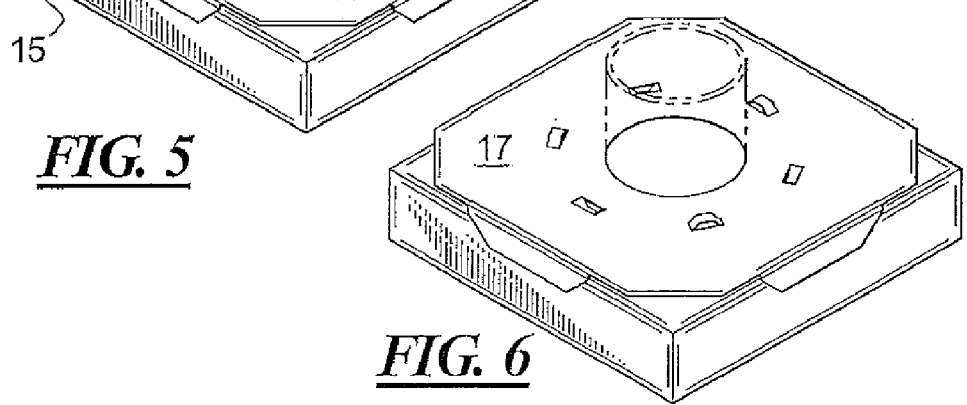
*FIG. 5*
*FIG. 6*

COMBINATION GRAVIMETRIC AND VOLUMETRIC DISPENSER FOR MULTIPLE FLUIDS

This application is a continuation-in-part of U.S. patent application Ser. No. 11/297,920 filed Dec. 8, 2005, still pending, which is a divisional of U.S. patent application Ser. No. 10/697,411, now U.S. Pat. No. 6,991,004.

BACKGROUND

1. Technical Field

An improved dispensing system and a process for dispensing various liquids of a dispensing system are shown and described. More specifically, an improved dispensing system is disclosed for combining multiple liquids and/or slurries of a liquid formulation whereby the multiple liquids include one or more base fluids which constitute a majority of the formulation and which can be dispensed by weight (i.e. gravimetrically) because the exact amount of such base ingredients is not important and further whereby the formulation includes smaller amounts of additives which must be dispensed precisely and, accordingly, are dispensed precisely by volume using the disclosed dispenser. The dispensing system includes a scale for measuring the amount of base materials added and a plurality of nutating pumps for accurately dispensing smaller amounts of additives. A controller is used to control the operation of valves through which the base materials are dispensed and for controlling the operation of the nutating pumps which dispense the smaller amounts of the various additives. An improved valve arrangement, stepper motor valve actuator and control mechanism for the gravimetric dispensing of base or bulk materials are disclosed.

2. Description of the Related Art

A number of liquid products such as inks, dyes, cosmetic lotions and paints are fabricated from a plurality of different liquids and/or slurries which include base materials or solvents and special additives such as colorants or tints or functional additives that affect the property of the liquid or slurry product.

Throughout this specification, the term "liquid" is meant to encompass slurries, pastes and other materials capable of being pumped. Various dispensers are known for dispensing the various ingredients of a liquid product into a container. Some of these dispensers are more accurate than others and some of these dispensers operate mote quickly than others. While the following discussion will be directed toward the formulation of paints, it will be noted that this application and the dispensers and methods of dispensing disclosed herein are applicable to various fields beyond that of paints and this disclosure generally applies to liquid formulations which consist of relatively large quantities of base materials or solvents or water and relatively small quantities of additives such as tints or colorants or other functional ingredients that must be added with precision.

Turning to the field of paints, it will be noted that paints are made in a vast number of different colors and shades of colors. Each specific paint color has a specific formula of components to provide the desired color. A paint formula generally includes a relatively large amount of a base component and smaller amounts of one or more colorants. Each colorant is measured according to the formula and dispensed from a bulk colorant supply, added to the base, and then mixed to produce the desired paint color.

Typically, the base material is pre-formulated and, in the retail environment, colorants are added to the paint by an existing colorant dispenser. Thus, the base is formulated separately and dispensed separately from the colorants. For example, U.S. Pat. No. 6,221,145 discloses a method of preparing base formulations for paints. The '145 patent teaches a method for preparing various base formulations at a retail store so paints can be sold with a specific use in mind, such as a flat base for walls, a high gloss base for wood and trim or other applications such as floors, concrete, etc.

To utilize the technology disclosed in the '145 patent a separate dispensing apparatus must be used to prepare the base formulation and a separate apparatus must be used to dispense the colorants because of the vastly different quantities used for the base materials and the colorants. Specifically, the base materials may be added by weight or maybe estimated by the technician who has some skill or experience. However, the colorants must be added very precisely as a one milliliter or less error in the amount of colorant can produce a noticeable error in the color of the paint product.

Fluid dispensing apparatuses exist that dispense formulations using an analog signal that is proportional to the amount the dispensing valve needs to be opened in order to produce a predetermined flow rate. For a large dispense of base materials, a high amplitude analog signal is used to move the dispense valve to a fully open position The analog signals are converted into a linear motion to open or close a dispensing valve as needed. In the past, this has been achieved by connecting the analog signal to a voltage to pneumatic pressure converter and applying the air pressure to an air cylinder connected to the dispensing valve. Such an air cylinder works against a spring inside the dispensing valve. While this system functions, it does not accurately reproduce the required flow rate from a given analog signal if the system is not calibrated accurately or frequently. This results in slow or inaccurate dispenses which have to be corrected by frequent adjustments to the calibration data. Thus, a need exists for an accurate and efficient method of opening and closing the base formulation dispensing valves.

Existing colorant dispensers have been used in retail paint supply stores and hardware stores. For example, existing colorant dispensing equipment has included manual and automated machines. Automated colorant dispensing equipment can include several bulk colorant containers, in which each colorant container is connected to an inlet of a fluid pump. The outlet of the fluid pump is connected to a 3-way valve which has a dispense outlet connected to a dispense nozzle and a by-pass outlet connected to a recirculation fluid line. Either one motor may drive all pumps or several pumps may be driven by a single motor through a common drive mechanism or each pump may be driven by an individual motor. When an amount of colorant is dispensed, the motor drives the pumps and the 3-way valve for the particular colorant is opened to allow the colorant to be dispensed through the nozzle. The time period that the valve remains open determines the amount of colorant dispensed. The other 3-way valves, which are all being simultaneously driven by the motor, are in a by-pass mode so that the colorant recirculates back into its container rather than being undesirably dispensed.

Other paint colorant dispensers utilize a nutating pump and a computer control system to control the pump. Nutating pumps have a piston which is positioned inside of a housing having a fluid inlet and a fluid outlet. The piston simultaneously slides axially and rotates inside of the housing. Existing nutating pumps have been operated by rotating the piston through a full 360° rotation and corresponding linear travel of the piston. Such piston operation results in a specific amount of fluid pumped by the nutating pump with each revolution. Accordingly, the amount of fluid pumped for any given nutating pump is limited to multiples of the specific volume. If a smaller volume of fluid is desired, then a smaller sized nutating pump is used or manual calibration adjustments are made to the pump.

For example, in paint colorants, a minimum dispense can be about 1/256 of a fluid ounce. U.S. Pat. Nos. 6,540,486 and 6,398,513 disclose improvements to nutating pump technology which provide for mote accurate dispensing of paint colorants and other fluids such as hair dyes and cosmetics applications. Both of these patents are commonly assigned with this application and are incorporated herein by reference.

While nutating pump technology has beneficial applications for the dispensing of relatively small quantities of liquids such as colorants and functional additives to a liquid formulation, nutating pumps lack the speed of other types of pumps and therefore are inefficient in terms of time when it comes to dispensing base materials and solvents. Thus, notwithstanding the developments disclosed in U.S. Pat. No. 6,221,145, many paint retailers prefer to carry pre-packaged bases to which they only need to add colorants by way of one of the currently available colorant dispensing machines. The reason being is that paint retailers are unwilling or unable to devote the amount of space that would be required to house two separate dispensing machines, one for base materials and one for colorants.

Specifically, currently available colorant dispensers are quite large due to the necessity of the cabinet housing a plurality of colorant canisters, such as eight or more (twelve preferably) and a separate pump for each canister. The bulkiness of the colorant dispenser is exacerbated by the need to include a controller, such as a central processing unit, a keyboard and a monitor and cabinet space to house these items. Further, some dispensers must include a large number of different colorants (in excess of twenty) thereby increasing the size of the cabinet that holds the canisters.

Because each store or retail facility is designed differently, many retailers are faced with the difficult task for making room for such large automated paint colorant dispensers in areas of limited space. As a result, there is a need for a more flexible design for automated paint colorant dispensers which would enable the configuration of these dispensers to be easily altered, depending upon the facility in which they are to be installed. The use of a separate machine to carry out the processes of the '145 patent would also be very problematic and would not be well received by merchants with limited floor space.

Further, most automated paint colorant dispensers are designed to dispense paint colorants into a large, five gallon pail or container. As a result, the shelf that supports the container is disposed vertically below the dispense outlet a sufficient distance so as to permit a five gallon container to be disposed on top of the supporting shelf but below the dispense outlet or nozzle. However, paint retailers also mix and sell paints in smaller quantities such as single gallons, quarts and pints. When a retailer needs to custom mix a smaller quantity of paint using an automated dispenser designed to dispense colorants into larger five gallon containers, a smaller container is disposed so far below the dispense outlet that splashing of the colorant as it reaches the smaller container is common and problematic. Obviously, when the colorant splashes outside of the container, the accuracy of the resulting paint color is compromised. Further, splashing of paint colorant outside of the container receptacle also results in colorant being splattered onto the dispensing apparatus causing it to be unsightly and in need of frequent cleaning. Thus, there is a need for an improved paint colorant dispenser design which enables the dispenser to easily accommodate large and small containers to thereby eliminate the splashing problem.

Therefore, there is a need for an improved fluid dispensing apparatus which is capable of quickly and efficiently dispensing large quantities of materials such as base materials or solvents, and which can quickly, efficiently, and accurately dispense small quantities of material such as tints, colorants or other additives. It would be very desirable to combine both of these very different functions in a single, compact machine that has a flexible design which enables the machine to be installed in a variety of different floor plans. Further, such an improved machine should preferably be able to accommodate containers of various sizes without the dripping problems associated with prior art machines.

SUMMARY OF THE DISCLOSURE

In satisfaction of the aforenoted needs, an improved gravimetric and volumetric fluid dispenser is disclosed. The dispensing system comprises a scale which is linked to a controller. The controller is linked to a plurality of two stage valves and a plurality of nutating pumps. The dispensing system also includes a plurality of base reservoirs that house base materials. Each base reservoir is connected to one of the two-stage valves and vice versa. The dispensing system also includes a plurality of additive reservoirs that house additives. Each additive reservoir is connected to one of the nutating pumps and vice versa. The dispensing system also includes a manifold for accommodating each two stage valve and a plurality of nozzles. Each nozzle is then connected to one of the nutating pumps and vice versa. As a result, the base materials can be dispensed sequentially and gravimetrically using signals from the scale to the controller and from the controller to the two stage valves and wherein the additives are dispensed volumetrically by controlling the nutating pumps with signals from the controller.

With regard to the dispensing of the base materials, computer software compares the weight of the liquid in the container to the weight of liquid required by a specific recipe. The controller, via an interface, sends out an analog signal that is proportional to the amount to which dispensing valves should be opened in order to produce a predetermined flow rate. The greater the amount of liquid that needs to be dispensed, the higher the required flow rate, which is based on speed and therefore time efficiency. As a dispense progresses, the converse is true as the amount remaining to be dispensed is reduced and the required flow rate is reduced. This process continues until the weight of liquid in the container is within a given tolerance of the required weight.

When the dispenser is initially installed, a calibration program is run. The program establishes a graph of analog output versus flow rate. During dispensing, software refers to the calibration graph in order to set the analog output needed for the required flow rate. It is essential for fast and accurate dispensing that this relationship between the analog output and the flow rate it produces does not change. Of course, the dispenser can be subsequently calibrated to enhance the accuracy of the system.

In a refinement, the dispensing system comprises a plurality of base pumps with each base reservoir being connected to one of the base pumps and vice versa for delivering each base material to its respective two stage valve under pressure.

In another refinement, the dispensing system also comprises a proportional control that is linked to the controller and each of the base pumps. The controller sends signals to the proportional control to control the output of each base pump, either directly at the base pump or by way of a control valve.

In a further refinement, the controller sends signals to the proportional control to increase or decrease the output of one of the base pumps at a time in response to signals received at the controller from the scale indicating the amount of the particular base material that is passed through its respective two-step valve.

In another refinement, each base reservoir houses a different base material Similarly, in another refinement, each additive reservoir houses a different additive In another refinement, the two stage valves are connected concentrically to the manifold in an outlet of each of said two stage valves is directed downward and toward a central axis around which the two stage valves are mounted to the manifold. Using this refinement, the base materials are directed toward an axial center of the container to minimize splashing.

In a further refinement of this concept, the manifold comprises a central opening disposed along the central axis. The central opening receives an orifice block comprising a plurality of orifices with each orifice accommodating a nozzle. Each nozzle is connected to one of the nutating pumps and vice versa. Thus, the additive materials are dispensed either along the central axis or in a close parallel relationship thereto.

In another refinement, the scale of the dispensing system comprises a horizontal surface for supporting the container to be filled with base materials and additives. In this refinement, the horizontal surface comprises indicia or upwardly protruding indicators to facilitate the centering of containers of different sizes under the manifold.

In yet another refinement, each two-step valve comprises a cylinder that includes a first end connected to an outlet port and a second end connected to an actuator with an inlet port disposed there between and which is connected to its respective base reservoir. The actuator is connected to a first end of a rod that has a second end that serves as a low flow plug. The rod slidably passes through a first spring disposed between the actuator and the low flow plug. The rod also slidably passes through a first sleeve disposed between the first spring and the low flow plug. A first end of the first sleeve engages the first spring and the second end of the first sleeve engages a second spring. The second end of the first sleeve also is connected to a second sleeve. The second sleeve connects the first sleeve to an annular high flow plug. The second spring is trapped between the first sleeve and a fixed annular retainer. The rod also slidably passes through the second spring and second sleeve and passes through the fixed annular retainer but is fixedly connected to the fixed annular retainer. The annular retainer comprises of first end directed towards the second end of the first sleeve and a second end which supports the second spring. In a closed position, the first spring biases the low flow plug of the rod and the annular high flow plug into a ceiling engagement with the outlet port by way of biasing pressure from the first spring against the first sleeve. To move from the closed position to a low flow position, the actuator pulls the rod away from the outlet post thereby causing the first end of the annular retainer to move towards the first sleeve and moving the low flow plug portion of the rod out of ceiling engagement with the annular high flow plug. To move from the low flow position to a high flow position, the actuator continues to move the rod away from the outlet port so that the first end of the annular retainer engages the second end of the first sleeve thereby causing the first sleeve to pull the second sleeve and the high flow annular plug away film the outlet port by overcoming the bias of the first spring.

In a refinement of the above concept, the two-step valve is closed from the high flow position to the closed position by moving back to the low flow position before the closed position.

In a further refinement, each two-step valve comprises a stepper motor actuator. The actuator functions to slidably engage the rod, thereby opening or closing the two-step valve. The stepper motor actuator has precisely 400 steps pet revolution and is connected via a driver unit to the controller. A threaded shaft is disposed between the stepper motor actuator and the valve cylinder. The shaft of the stepper motor actuator is coupled to the threaded shaft through a flexible coupling. In response to rotation of the stepper motor actuator, the threaded shaft raises or lowers the slidable valve member to open or close the valve. In one embodiment, the threaded shaft drives a nut or other coupling device, which is attached to a bracket or other coupling device. The bracket raises a cap that is secured to the upper end of the rod, thereby raising the low flow plug and opening the valve. Various other schemes for coupling the drive shaft to the threaded shaft and the threaded shaft to the valve member will be apparent to those skilled in the art. The threaded shaft, which may be an Acme lead screw, for example, is supported by thrust bearings. The nut or coupler, which may be an Acme nut, for example, is prevented from rotating by an anti-rotation bearing. A fully closed position of the valve is sensed and communicated to the controller via an optical sensor. The stepper motor actuator is under the control of analog input from the controller. Once dispensing is complete, the stepper motor actuator is driven to a closed position, in turn, lowering rod and closing the valve.

In another refinement, the base reservoirs of the dispensing system are located remotely from the manifold by a distance of greater than 15 feet and the nutating pumps are disposed in close proximity to the manifold, within about 10 feet.

In another refinement, the dispensing system comprises at least five base reservoirs, each housing at least five different base materials and at least five, two stage valves. In a further refinement, the dispensing system further comprises at least ten additive reservoirs and at least two nutating pumps.

In another refinement, the base materials are base materials for paint and the additives are colorants for paint and the dispensing system is a paint dispenser.

An improved method for dispensing a paint formula comprising a plurality of base materials and a plurality of colorants into a container is disclosed which utilizes a single dispensing apparatus. The method comprises placing a container on a scale; dispensing one or more base materials into the container by weight; dispensing the colorants into the container by volume; dispensing any remaining base materials into the container by weight.

In a refinement, such a dispensing method can be carried out using the dispensing systems disclosed above. In a further refinement, one or more additional ingredients may be added by hand.

Similarly, an improved method for dispensing a liquid formula is disclosed wherein the liquid formula comprises a plurality of liquid base materials and a plurality of liquid additives. Again, a single dispensing apparatus is utilized and the method comprises: placing a container on a scale; dispensing one or more base materials into the container by weight; dispensing the additive materials into the container by volume; and dispensing any remaining base materials into the container by weight.

The dispensing systems and methods disclosed herein are applicable beyond the paint industry, such as cosmetics, beverages, dyes, inks, liquid nutritional products, medicinal products and other liquid formulations that include relatively large quantities of base materials and relatively small quantities of colorants or other additives.

Other advantages and features will be apparent from the following detailed description when read in conjunction with the attached drawings.

BRIEF DESCRIPTION OF THE DRAWINGS

For a more complete understanding of the disclosed dispensing systems and dispensing methods, reference should be made to the embodiments illustrated in greater detail in the accompanying drawings, wherein:

FIG. 3 is a partial front plan view of the dispensing system shown in FIG. 1;

FIG. 4 is a top plan view of the horizontal surface of the scale of the dispensing system shown in FIGS. 1-3;

FIG. 5 is a perspective view of the scale as shown in FIG. 4 with a one gallon container disposed thereon;

FIG. 6 is another perspective view of the scale shown in FIGS. 4 and 5 but illustrating the placement of a smaller one quart container disposed thereon;

It should be understood that the drawings are not necessarily to scale and that the embodiments are sometimes illustrated by graphic symbols (e.g., the pneumatic pumps), phantom lines, diagrammatic representations and fragmentary views. In certain instances, details which are not necessary for an understanding of this disclosure or which render other details difficult to perceive may have been omitted. It should be understood, of course, that this disclosure is not limited to the particular embodiments and methods illustrated herein.

DETAILED DESCRIPTION OF THE PRESENTLY PREFERRED EMBODIMENTS

Figure 1:
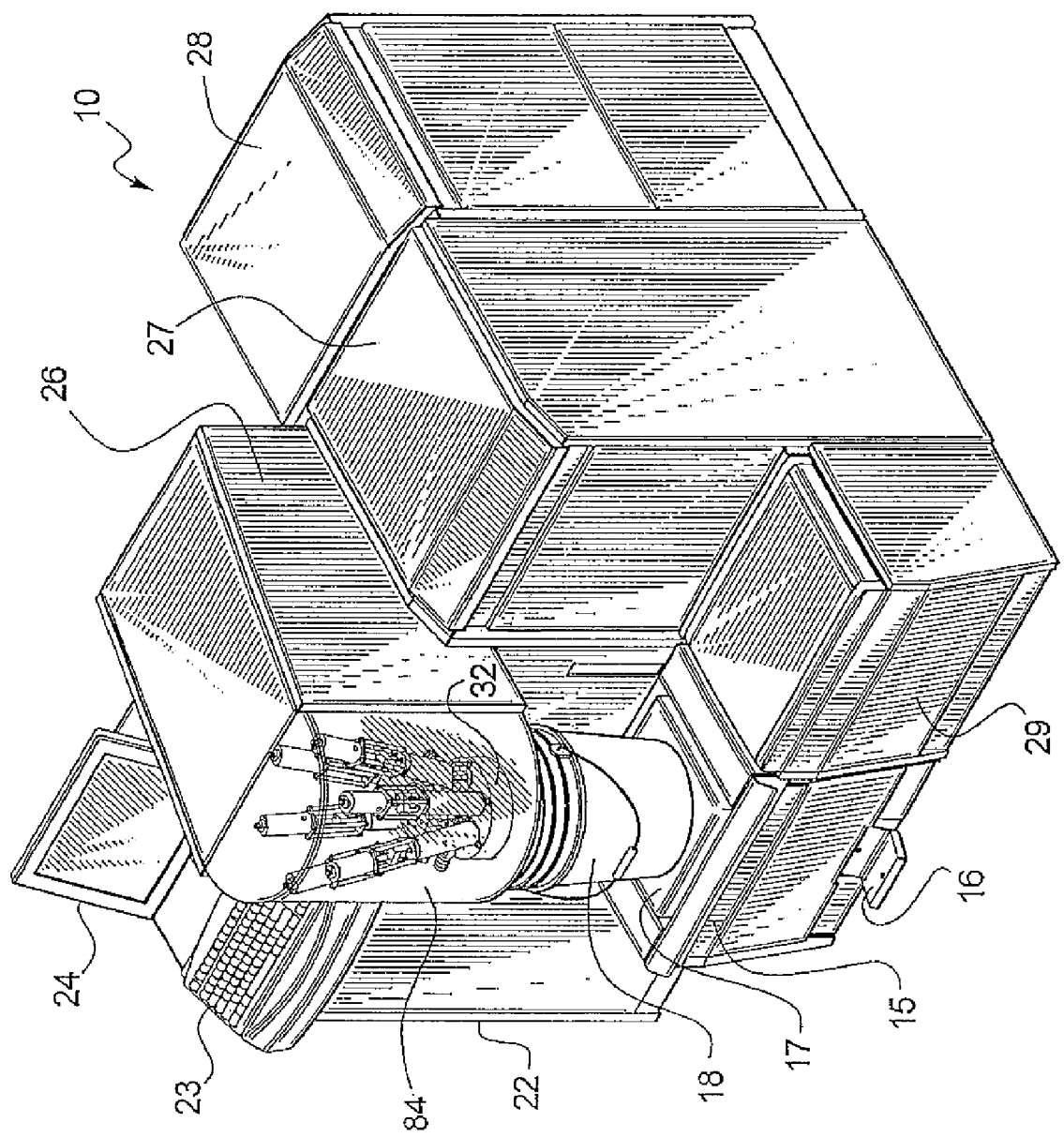
FIG. 1 is a perspective view of a dispensing system made in accordance with this disclosure.

FIG. 1 illustrates, in part, a dispensing system 10 made in accordance with this disclosure. FIG. 1 is only a partial illustration because, as illustrated in FIG. 2, the dispensing system 10 also includes a plurality of base reservoirs 11, pumps 12 which are connected to the individual base reservoirs shown at 11 and conduits shown at 13 linking the base reservoirs 11 to the two-step valves shown at 14, all shown in FIG. 2.

Returning to the dispensing system 10 shown in FIG. 1, the system 10 includes a scale 15 which may be adjusted vertically by way of the foot pedal 16 so that the horizontal surface 17 may be raised or lowered to accommodate a larger or smaller container than the one shown at 18 in FIG. 1. As shown in FIG. 2, the scale 15 is linked to a controller 21 which is housed in the cabinet 22 disposed below the keyboard 23 and monitor 24 as shown in FIG. 1. Referring to FIGS. 1 and 2 together, it will also be noted that a proportional control 25 is also linked to the controller 21 and disposed in the cabinet 22. It will be noted that the cabinet 22 is not fixedly connected to the center cabinet 26 or the additive canister cabinets 27, 28. Thus, the arrangement shown in FIG. 1 is but one arrangement for the dispenser 10 and the cabinets 27, 28 can be disposed on either side of the cabinets 26 and 22 or behind the cabinets 26 and 22. Further, the container support 29 is not connected to the scale 15 it may be eliminated or moved to either side of the scale 15.

Figure 2:
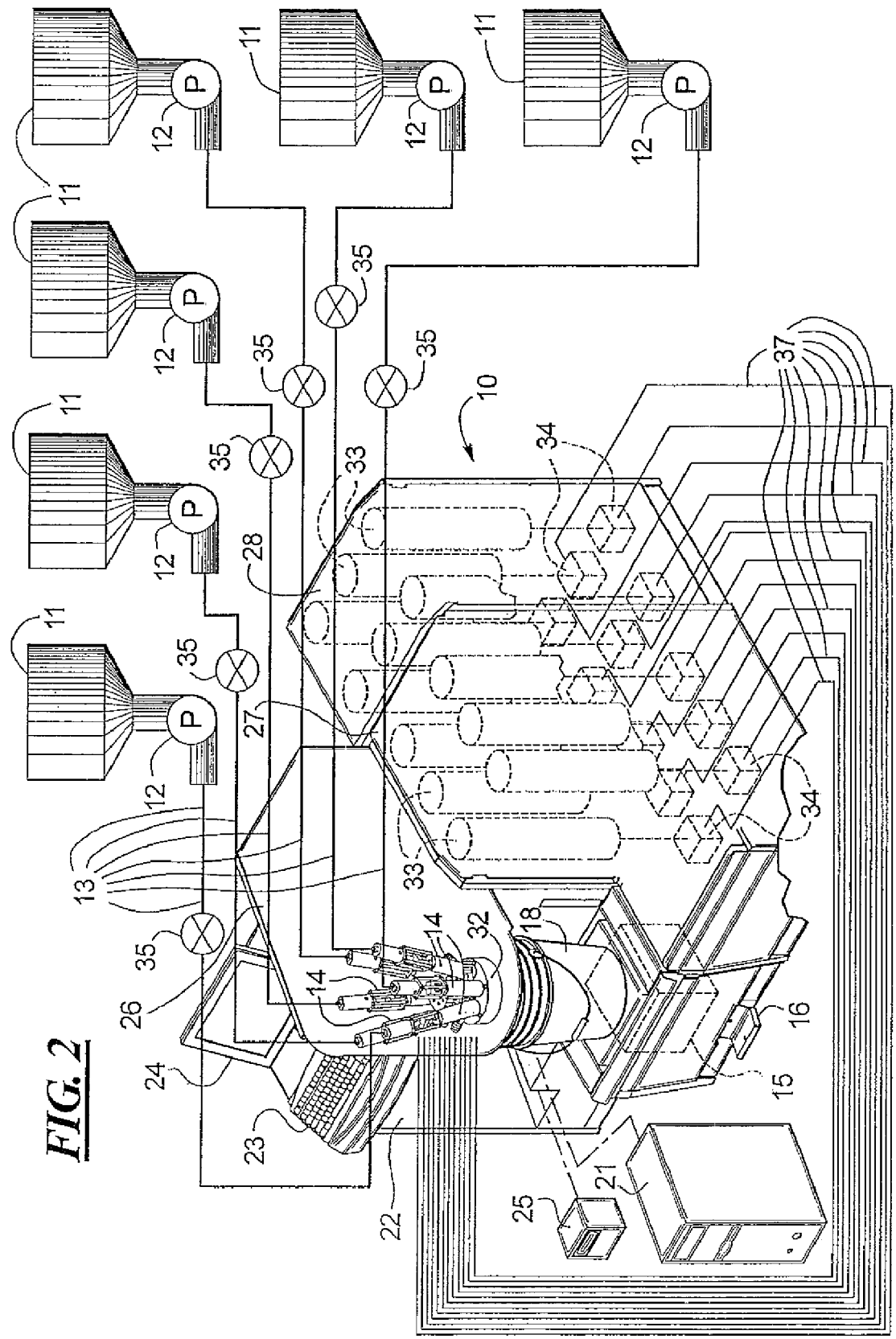
FIG. 2 is a schematic illustration of the dispensing system disclosed in FIG. 1 further illustrating the relationships between the controller, the proportional control and the base reservoirs and pumps connected thereto along with the placement of the additive containers and pneumatic pumps in the disclosed modular cabinetry.

The center cabinet 26 houses the two-step valves 14, the manifold block 32 and the various conduits leading from the additive canisters disposed within the cabinets 27, 28 and the conduits connecting the two-step valves 14 to the base reservoirs 11 shown in FIG. 2.

Turning to FIG. 2, the cabinets 27, 28 accommodate a plurality of additive canisters shown in phantom at 33 and their corresponding nutating pumps shown in phantom at 34.

In operation, when dispensing a liquid formula into the container 18 that comprises one or more base materials that constitute the majority of the liquid and the finished formulation and a plurality of additive materials that constitute a minority of the liquid of the finished formulation, a preferred method for operating the dispensing system 10 is as follows.

First, recognizing that the base reservoirs 11 may each contain a different base material and while six base reservoirs 11 are shown but leaving the possibility that only a single base material is used thereby requiring only a single base reservoir 11 and pump 12, the system 10 will begin first with the transport of base material from one of the reservoirs 11 through its respective conduit 13 and to its corresponding two-step valve 14. The base material is delivered to the two-step valve 14 under pressure by way of its corresponding pump 12. Thus, a dispensing system 10 begins by opening one of the two-step valves 14 by way of a signal from the controller 21 thereby allowing base material to pass through the valve 14 and into the container 18.

To avoid splashing of base material in the container 18 and to provide a smooth initial flow of base material through its respective valve 14, the proportional control 25 may be utilized in one of two different ways. The proportional control 25 may control the speed of the pump 12 being utilized to modulate the flow of base material from its base reservoir, through its respective conduit 13 to its respective valve 14 to thereby provide a relatively slow initial flow though the valve 14. Then, after the initial flow is established, the proportional control 25 may increase the speed of the pump 12 being utilized to increase the flow through the two-step valve 14. Another method would include the use of one or more control valves shown at 35 which could be linked to the proportional control 25 or directly linked to the controller 21 for that matter to modulate the initial flow of base material through its respective conduit 13. Either way, the proportional control 25 may be controlled by the controller 21.

As the first base material enters the container 18, the scale 15 registers the weight chain and transmits a stream of signals to the controller 21. As the amount of base material deposited in the container 18 approaches the desired amount for that base material, the proportional control 25 may then slow the flow of base material through the valve 14, again to eliminate any potential splashing problem. As the desired amount is reached, the controller 21 then sends a signal to close the valve 14 that is currently being utilized. The sequential operation of the two-step valves 14 will be discussed below with respect to FIG. 8a. The signal from the controller 21 to the valve 14 is actually a signal to activate the actuator 36 of the valve 14.

This process may be carried out for one or more of the base materials being delivered from the base reservoirs 11. In a preferred scheme, one or more base materials to be added to the container 18 from the base reservoirs 11 is "saved" until after the addition of the additives. By utilizing this scheme, the smaller volumes of the additives are added between layers of base material to facilitate later mixing of the formulation in the container 18.

With at least part of the base materials from the reservoirs 11 added to the container 18, the controller 21 will then sequentially operate one or more of the pneumatic pumps 34 to begin the addition of the additive materials to the container 18. Operation of the pneumatic pumps 34 need not be described in detail here as their operation is explained in detail in U.S. Pat. Nos. 6,540,486 and 6,398,513, both of which are incorporated herein by reference. Operating sequentially or consecutively, the pneumatic pumps 34 draw additive fluid from their respective canister 33 and pump the fluid though its respective conduit line 37 to the manifold block 32 which will be described in detail below in connection with FIGS. 7 and 10-13. After the addition of the additive materials from the canisters 33 by way of the nutating pumps 34 and conduits 37, additional base materials are added on top of the additive materials from one or more of the base reservoirs 11 in the manner described above. Again, base materials from the reservoirs 11 are added gravimetrically, that is by weight using a feedback control loop incorporated into the software used by the controller 21 which operates the proportional control 25 and directly or indirectly operates the pumps 12 and/or the valves shown at 35. Nutating pumps 34 are preferred for the additive materials because they are accurate volumetric dispensing pumps that are capable of being accurate to within several hundredths of an ounce as disclosed in '486 and '513 patents.

Turning to FIG. 3, it will be noted that a large container 18 such as a five gallon pail can be easily accommodated by the dispensing system 10 as shown in FIGS. 3-5, the horizontal support surface 17 of the scale 15 can include two or more indicia 41, 42 for assisting the user in centering the container 18 under the block manifold 32. One set of indicia 41 could be for a five gallon container and another set of indicia 42 could be for a quart size container. Additional indicia could be utilized for smaller containers, such as pint size containers or containers larger than one gallon or five gallons and metric containers as well. Thus, this disclosure is not limited to the two indicia system shown for the horizontal surface 17 in FIGS. 3-6.

Figure 7:
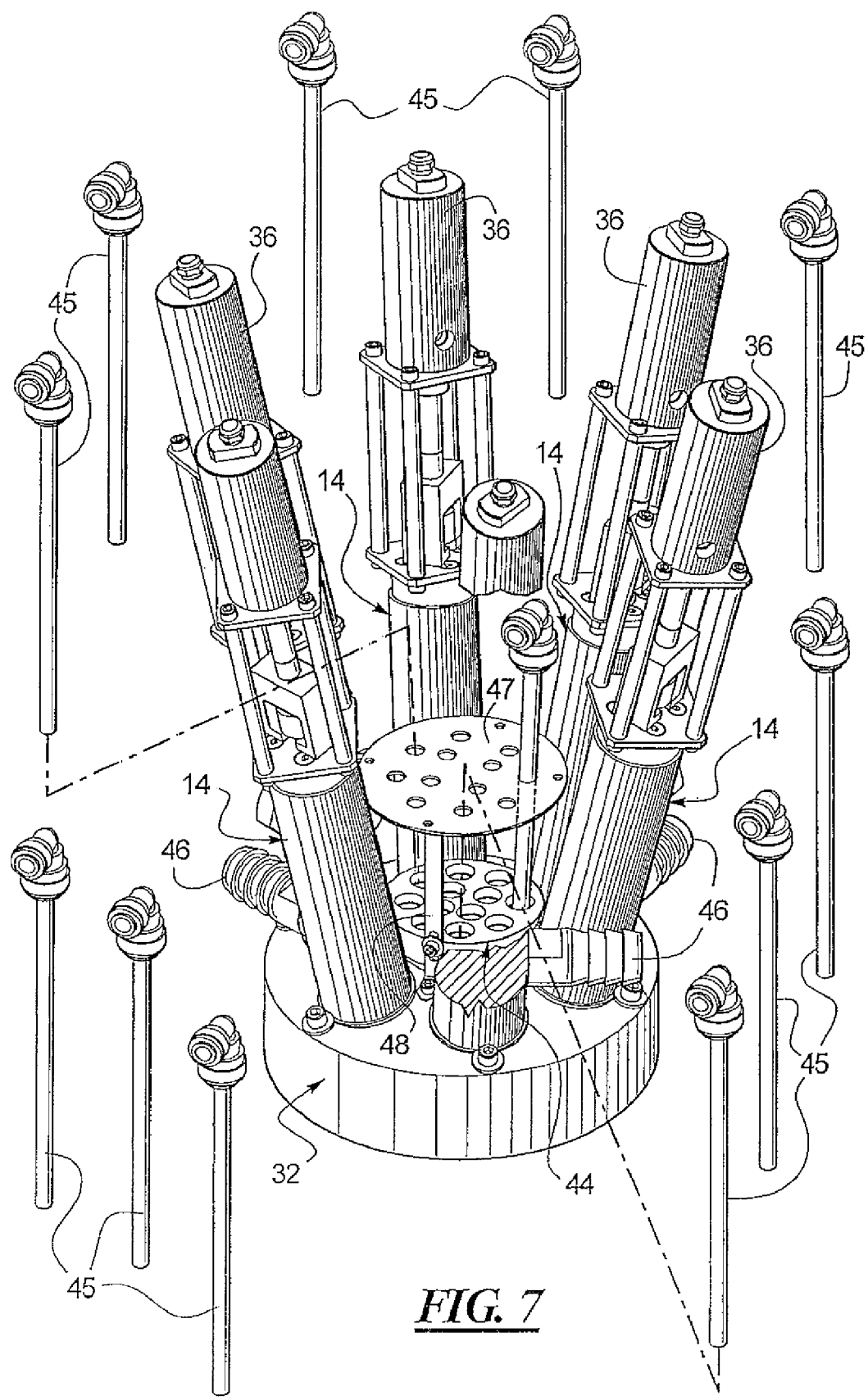
FIG. 7 is a partial exploded view of the manifold, additive nozzles, orifice block and two-step valves of the dispensing system shown in FIGS. 1-3.

Turning to FIG. 7, the manifold block 32 concentrically accommodates in this case six different two-step valves 14. The valves 14 are controlled by actuators 36, the operation thereof being discussed in detail below with respect to FIGS. 8b-8d. The valves 14 are also angled inward toward an axial center of the manifold block 32 so that the large volumes of base material pumped through these valves 14 is directed toward an axial center of the container 18 by way of the horizontal surface 17 of the scale 15 assisting the user in centering the container 18 beneath the manifold block 32. Along an axial center of the manifold block 32 is an additional orifice block 44 which accommodates a plurality of nozzles 45 each of which are connected to a nutating pump 34 (see FIG. 2). Referring back to the two-step valves 14, it will be noted that each valve 14 includes an inlet port 46 that is connected to one of the lines 13 thereby connecting each valve 14 to its respective base reservoir 11 (see FIG. 2) The nozzles 45 comprise long stems which, in turn, are passed through and are supported by the support plate shown at 47 which is bolted above the orifice block 44 by these supporting posts 48.

Figure 8A:
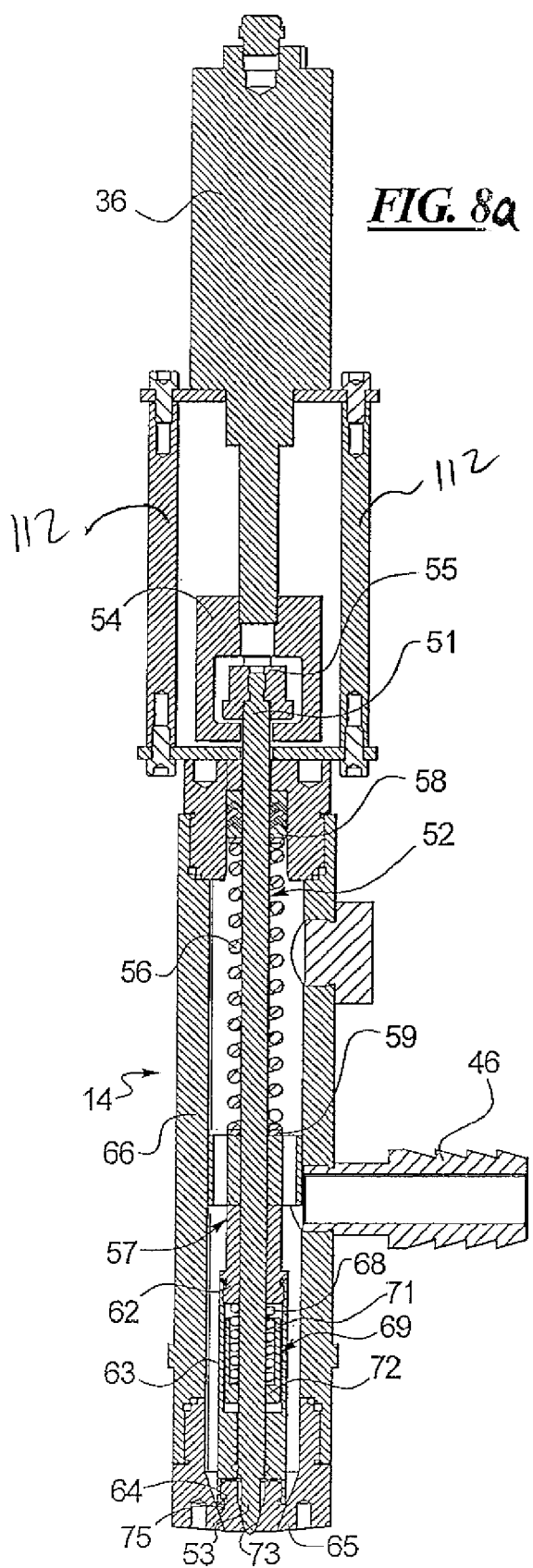
FIG. 8a is a sectional view of one of the two-step valves shown in FIG. 7.
Figure 11:
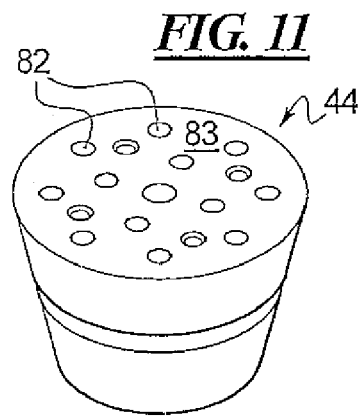
FIG. 11 is a bottom perspective view of the orifice block shown in FIG. 7.
Figure 12:
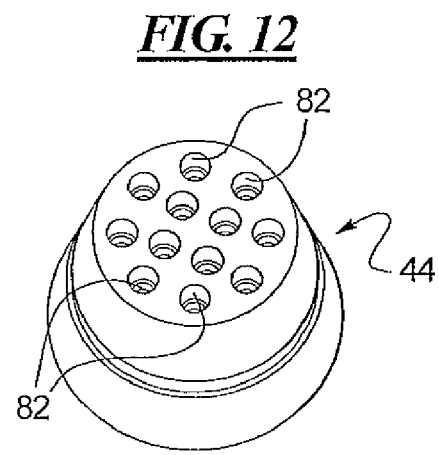
FIG. 12 is a top perspective view of the orifice block shown in FIGS. 7 and 11.
Figure 13:
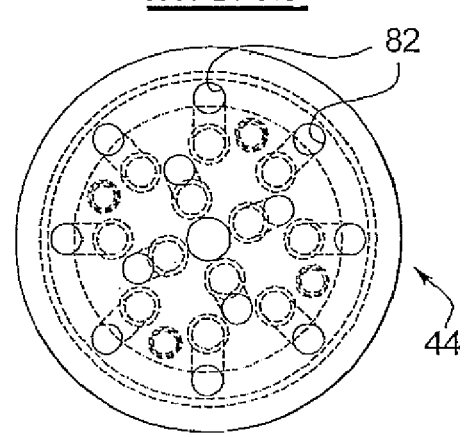
FIG. 13 is a bottom plan view of the orifice block shown in FIGS. 7 and 11-12

Turning to FIG. 8a, the two-step valve 14 and actuator 36 are shown in greater detail. The actuator 36 is coupled to the first end 51 of a rod 52 that also has a second end 53 that serves as a low flow plug. The actuator 36 may be coupled to the rod 52 by way of a bracket 54 or other suitable coupling mechanism. A cap 55 may be used to secure the end 51 or the rod 52 to the actuator 36. One preferred actuator 36 is described in greater detail below with respect to FIGS. 8b, 8c, and 8d. The actuator 36 is used to raise or lower the rod 52. The rod 52 passes through a first spring 56 before passing through a first sleeve 57. The spring 56 is sandwiched between the bushing 58 and the first end 59 of the first sleeve 57. The rod 52 slidably passes through the first spring 56 and the first sleeve 57. The second end 62 of the first sleeve 57 is connected to a second sleeve 63. The second sleeve 63 serves to connect the first sleeve 57 to the annular plug 64. The low flow plug 53 of the rod 52 and the high flow annular plug 64 serve to close the outlet 65 of the cylinder 66. The rod 52 also slidably passes through the second sleeve 63 as well as the second spring shown at 68. While the rod 52 further passes through the annular retainer 69, the rod 52 is fixedly connected to the annular retainer 69. While the first end 71 of the annular retainer faces the second end 62 of the first sleeve 57, the second end 72 of the annular retainer 69 is fixed to the rod 52. The annular retainer 69 selves as a support and partial housing for the second spring 68.

The valve 14 as shown in FIG. 8a is in a closed position. To open the valve 14, the actuator 36 draws the rod 52 upward against the bias of the first spring 56. The rod 52 slides through the first and second sleeves 57 and 63 thereby displacing the low flow plug 53 from the center aperture of the high flow annular plug 64. A relatively low flow is established through the aperture 73 (which serves as a seat for the low flow plug 53) as defined by the high flow annular plug 64 and the inlet port 46. To fully open the two-step valve 14, the actuator 36 continues to draw the rod upward and, the first end 71 of the annular retainer 69 approaches and engages the second end 62 of the first sleeve 57. This action causes the first and second sleeves 57, 63 to be pushed upward against the bias of the first spring 56 thereby pulling the high flow annular plug 64 upward and off of the seat 75 of the outlet port 65 thereby enabling the valve 14 to achieve a fully open position and high flow between the inlet port 46 and the outlet port 65.

To close the valve 14, the actuator 36 and controller 21 (see FIGS. 8b-8d) execute a reverse action with the high flow annular plug engaging the seat 75 first before the low flow plug 53 of the rod 52 engages the seat or aperture 73 of the high flow annular plug 64. A two-step valve like the one shown in detail at 14 in FIG. 8a is preferred because when opening the valve 14, a low flow operation is achieved first upon displacement of the low flow plug 53 of the rod 52 before a high flow operation is achieved when the high flow annular plug is displaced from the seat 75. Similarly, when the actuator 36 closing the valve 14, the valve 14 moves from a high flow operation where the high flow annular plug is displaced from the seat 75 to a low flow operation where the annular plug 64 is seated against the seat 75 prior to seating of the low flow plug 53 against the seat 73.

Figure 8B:
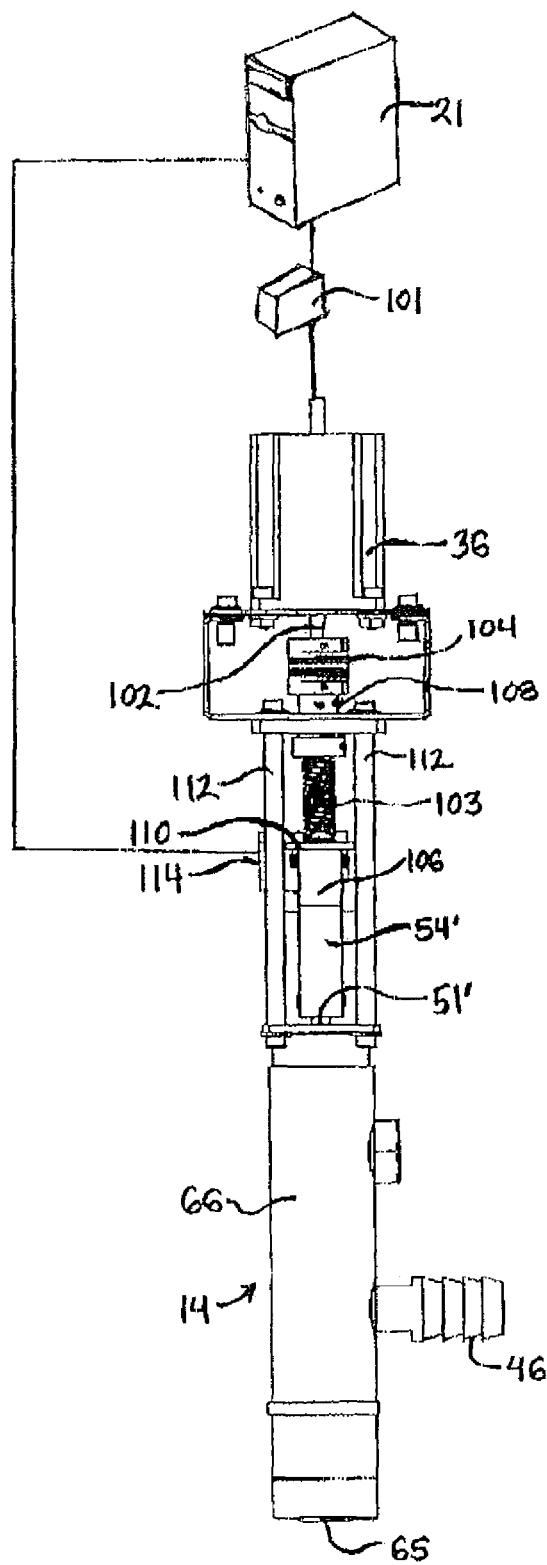
FIG. 8b is a plan view of a disclosed actuator and two-step valve.
Figure 8C:
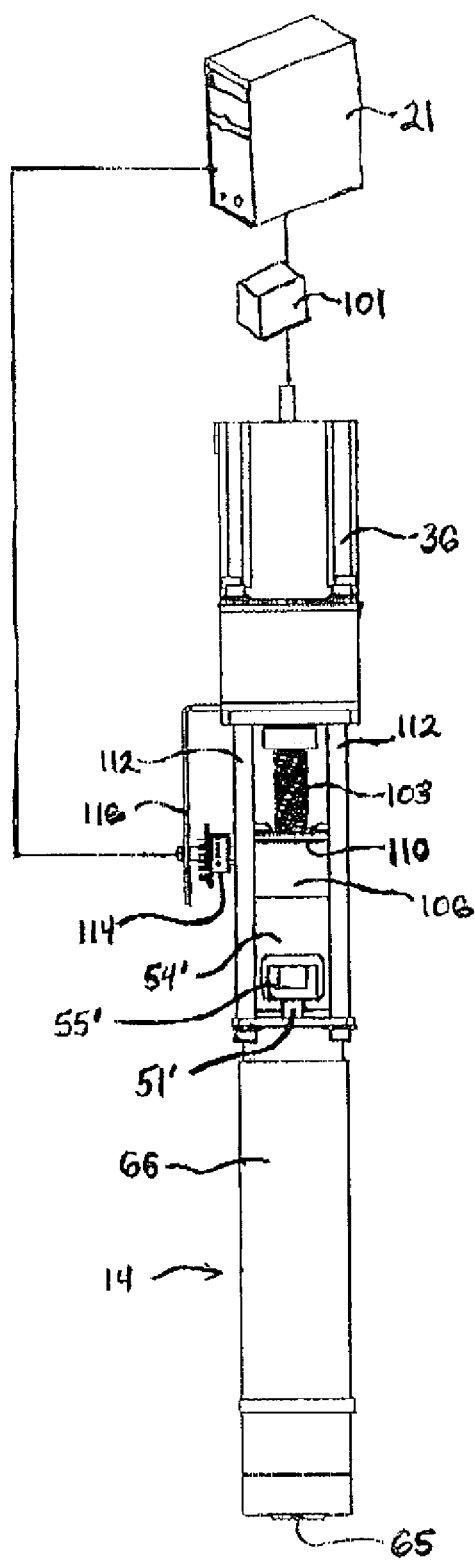
FIG. 8c is another plan view of the actuator and two-step valve shown in FIG. 8b.
Figure 8D:
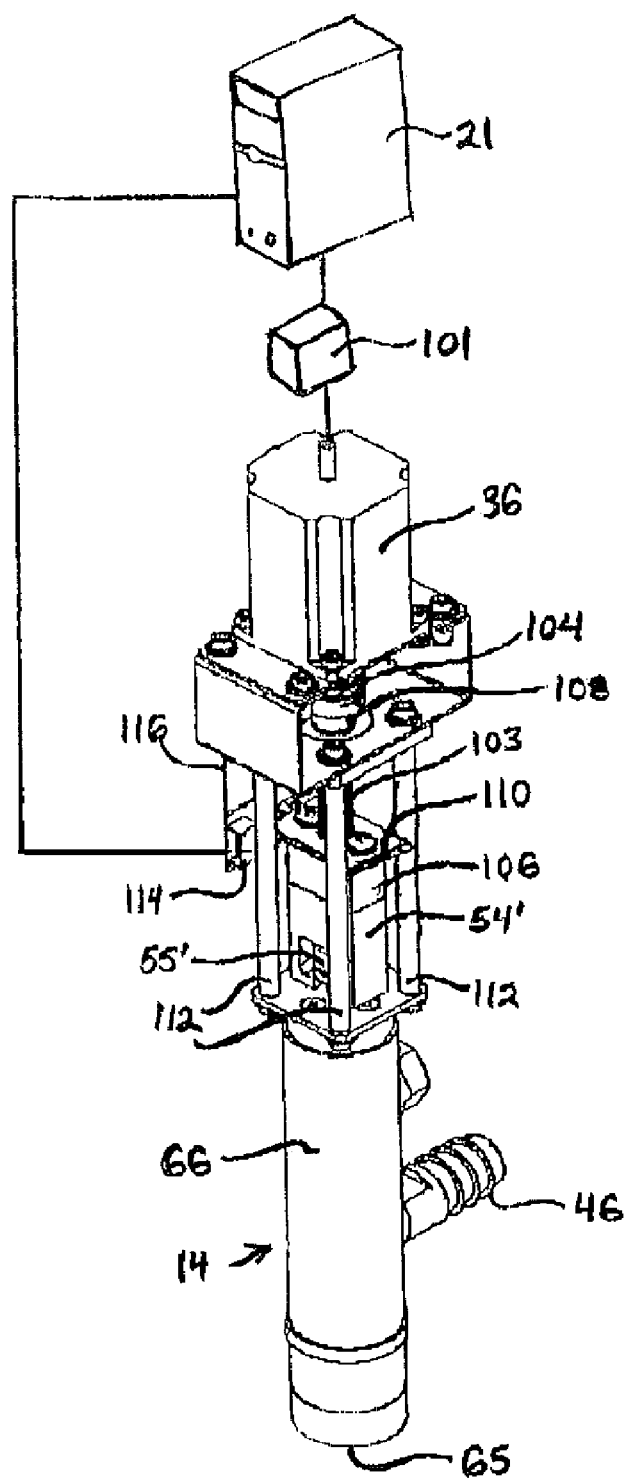
FIG. 8d is a perspective view of the actuator and two-step valve shown in FIGS. 8b and 8c.

FIGS. 8b, 8c, and 8d, depict the actuator 36 for opening and closing the two-step valve 14 shown in FIG. 8a. Specifically, the actuator 36 may be a stepper motor actuator. One preferred stepper motor actuator 36 has 400 steps per revolution although the number of steps may vary. The stepper motor actuator 36 may be linked via a driver unit 101 to a controller 21 or linked directly to the controller 21. The driver unit 101 serves to translate the signals of the controller 21 for execution by the stepper motor 36. The driver unit 101 may also be incorporated into the controller 21 or be a part of the stepper motor 36. The controller 21 has an analog input and a control program that will scale the analog input to an absolute position. In one example, which can be varied, a zero to five volt signal is scaled to zero to 3000 steps, which produces zero to 7.5 turns of the motor shaft 120. Such a configuration is accurate to within 1 step or 0025" vertical movement of the shaft 52.

The stepper motor actuator 36 is positioned above the cylinder 66 of the valve 14. Among other things, disposed between the stepper motor actuator 36 and the cylinder 66 is a threaded shaft 103 having a pitch of ten threads per inch. The drive shaft 102 of the stepper motor actuator 36 is coupled to the threaded shaft 103 through a flexible coupling 104. Upon rotation of the driver shaft 102 of the stepper motor actuator 36, the threaded shaft 103 drives a nut or coupling device 106, which is attached to a bracket 54' or other suitable attachment mechanism. The bracket 54' raises and lowers a cap 55' secured to the end of the rod 51'. Thus, the actuator 36 is coupled to the threaded shaft 103 which is coupled to the valve member or slidable rod 51. As described in reference to FIG. 8, the rod 51' also has a second end 53 (not shown in FIGS. 8b-8d, see FIG. 8a) that serves as a low flow plug. Through operation of the stepper motor valve 36, the rod 51' may be raised 75" from the home or closed position, thereby opening the valve. The threaded shaft 103 is supported by thrust bearings 108 to carry the load produced by a spring 56 (shown in FIG. 8a) inside the dispense valve 14. The coupler 106 is prevented from rotating by an anti-rotation bearing 110 that slides between four support shafts 112.

Before dispensing starts, the stepper motor controller 21 drives the stepper motor actuator 36 to a home position. The home position, or zero volt, zero step position, is the position at which the valve 14 is fully closed. This home position is sensed and communicated to the controller 21 via an optical sensor 114, the beam of which is broken by a flag (not shown) attached to the coupler 106. Alternatively, the optical sensor 114 may use the light beam in combination with a mirror for communicating the home position. The optical sensor 114 may be attached with a downward extending arm 116 as seen in FIG. 8d.

During dispensing, the stepper motor actuator 36 is under the control of the analog input from the controller 21. Once dispensing is complete, the stepper motor actuator 36 is driven to the home position, in turn lowering rod 51' and ensuring that valve 14 is fully closed. Conventional software may be employed on the controller 21 for purposes of controlling the stepper motor 36, as will be apparent to those skilled in the art.

Figure 9:
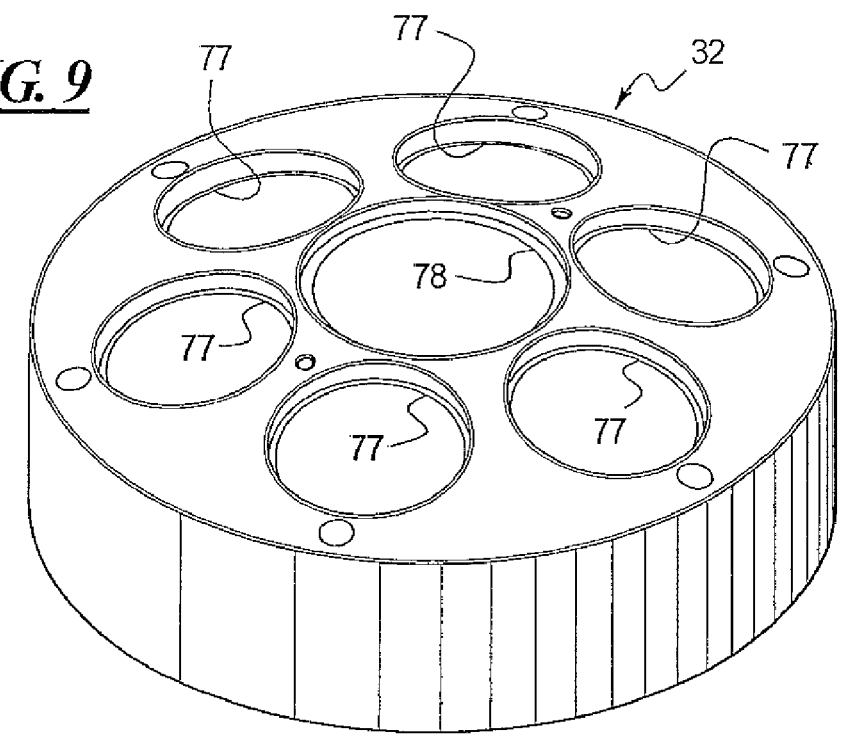
FIG. 9 is a bottom perspective view of the manifold block shown in FIG. 7.
Figure 10:
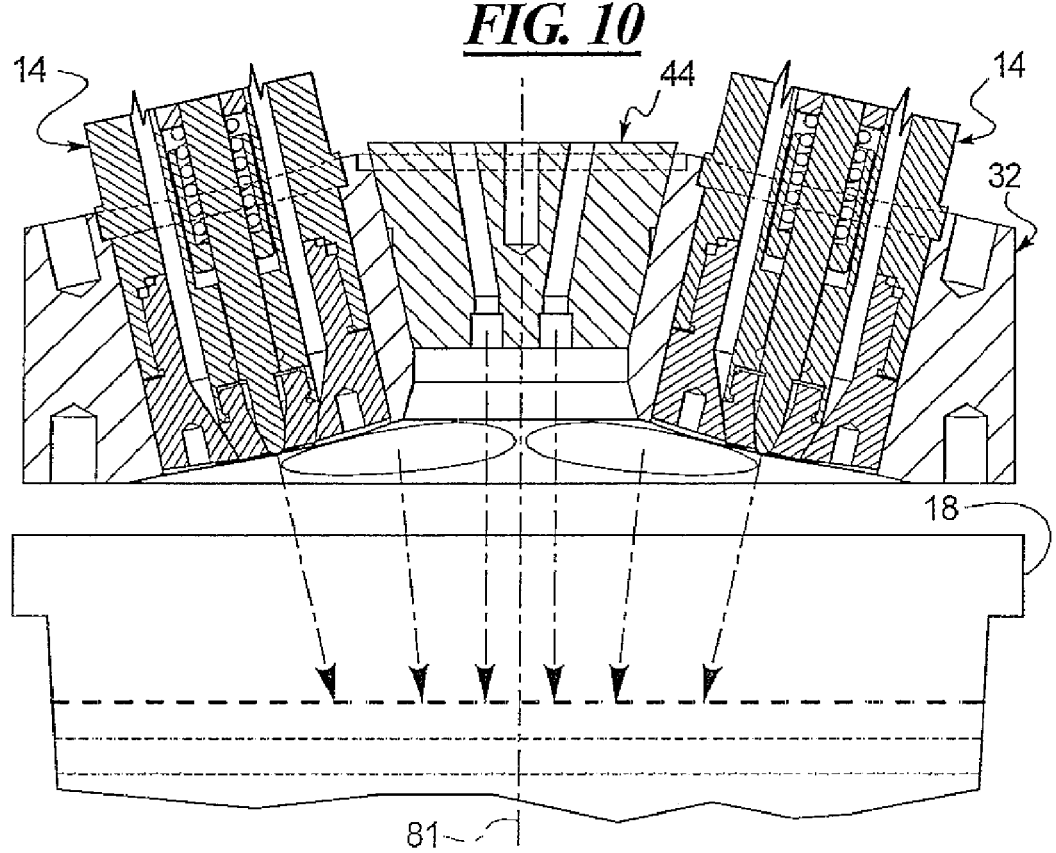
FIG. 10 is a sectional view of the manifold block, orifice block and a pair of two-step valves as shown in FIG. 7 indicating the dispense direction of base materials and additives.

Turning to FIG. 9, a bottom perspective view of the manifold block 32 is shown. Aperture 77 accommodates the two-step valves 14 and the central aperture 78 accommodates the orifice block shown in FIGS. 11-13. The apertures 77 are angled thereby directing flow from the valves 14 towards an axial center 81 shown in FIG. 10 which passes through an axial center of the aperture 78. Thus, the base materials are injected into the container 18 towards the axial center 81 thereof as shown in FIG. 10.

The orifice block 44 as shown in FIGS. 10-13 includes an orifice 82 for each of the nozzles 45 shown in FIG. 7. Referring to the bottom surface 83 of the orifice block 44 shown in FIG. 11 it will be noted that the surface is primarily flat and therefore easy to clean and is easily assessable beneath the front housing 84 shown in FIG. 1.

A key advantage to the dispensing system 10 shown and described here is that base materials and additive materials may be dispensed into a container using a single system. Further, as shown in FIG. 2, the larger reservoirs 11 of base material may be stored at a remote location from the dispensing apparatus 10. For example, base material may be stored in large hoppers 11 disposed outside of the retail environment or outside of a shop or factory floor thereby conserving valuable floor space. The modular design of the cabinetry 27, 28 for the additive canisters 33 enables the design of a system with as few as three or four additive canisters 33 to as many as twelve or more additive canisters 33 as shown in FIG. 2. Further, by providing a method of dispensing whereby at least a portion of the base materials are added to the container 18 first prior to the additive materials and then followed by addition of further base materials, improved mix ability results for viscous fluids, such as paints.

While only certain embodiments have been set forth, alternatives and modifications will be apparent from the above description to those skilled in the art. These and other alternatives are considered equivalents and within the spirit and scope of this disclosure and the appended claims.

What is claimed:

1. A valve and control mechanism for use in a fluid dispensing system, comprising:
    a stepper motor capable of receiving an analog signal from a controller;
    the stepper motor being coupled to a threaded shaft that is coupled to a slidable rod for raising and lowering a first end of the slidable rod, the slidable rod comprising a second end that serves as a low flow plug of a two-step valve; and
    an optical sensor for communicating the position of the valve to the controller;
    wherein the stepper motor comprises a drive shaft that is coupled to the threaded shaft through a flexible coupling; and
    a coupling device linking the threaded shaft to a bracket which couples the threaded shaft to the slidable rod, the mechanism further comprising an anti-rotation bearing that slides between a plurality of support shafts, thereby preventing unintended rotation of the coupling device.

2. The valve and control mechanism of claim 1, wherein the stepper motor actuator has about 400 steps per revolution.

3. The valve and control mechanism of claim 1, wherein a driver unit is employed between the stepper motor actuator and the controller.

4. The stepper motor actuator in combination with the two-step valve of claim 1, wherein the threaded shaft has a pitch of ten threads per inch.

5. The valve and control mechanism of claim 1, further comprising thrust bearings for supporting the threaded shaft.

6. The valve and control mechanism of claim 1 wherein the two-step valve is for dispensing a base material for paint.

* * * * *